US012659112B2

(12) United States Patent　　　　　(10) Patent No.:　US 12,659,112 B2
Guo　　　　　　　　　　　　　　　　　　(45) Date of Patent:　Jun. 16, 2026

(54) SIGNAL AND CHANNEL SELECTION WITH MULTIPLE PORTS

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 375 days.

(21) Appl. No.: 18/502,064

(22) Filed: Nov. 5, 2023

(65) Prior Publication Data

US 2024/0063977 A1　　　Feb. 22, 2024

Related U.S. Application Data

(63) Continuation of application No. PCT/IB2022/054289, filed on May 9, 2022.

(Continued)

(51) Int. Cl.
　　*H04L 5/00*　　　　　(2006.01)
　　*H04B 7/0404*　　　(2017.01)
　　*H04B 7/06*　　　　(2006.01)

(52) U.S. Cl.
　　CPC ......... *H04L 5/0051* (2013.01); *H04B 7/0404* (2013.01); *H04B 7/0691* (2013.01); *H04B 7/06956* (2023.05); *H04L 5/0023* (2013.01)

(58) Field of Classification Search
　　CPC ... H04L 5/0051; H04L 5/0023; H04L 5/0044; H04L 5/0058; H04L 5/0094;
(Continued)

(56) References Cited

U.S. PATENT DOCUMENTS

2020/0107341 A1　4/2020　Zhang et al.
2020/0235802 A1　7/2020　Nilsson
(Continued)

FOREIGN PATENT DOCUMENTS

CN　　109417717　　3/2019
WO　　2021020847　　2/2021

OTHER PUBLICATIONS

EPO, Extended European Search Report for EP Application No. 22806938.1, Oct. 18, 2024.
(Continued)

*Primary Examiner* — Mounir Moutaouakil
(74) *Attorney, Agent, or Firm* — Hodgson Russ LLP

(57)　　　　　　ABSTRACT

A method, a UE, and a BS are provided. The method includes obtaining information associated with sets of antenna ports comprising a first and second sets of antenna ports, where the first set of antenna ports correspond with a first antenna panel of the UE, and the second set of antenna ports correspond with a second antenna panel of the UE, selecting a target set of antenna ports of the sets of antenna ports based on a determination that information associated with the target set of antenna ports satisfies a set of criteria, in response to a selection of the target set of antenna ports, configuring UE configuration parameters associated with the target set of antenna ports to associate an uplink transmission with a set of PUSCH layers associated with the target set of antenna ports; and sending the uplink transmission to a BS via the set of PUSCH layers.

18 Claims, 4 Drawing Sheets

Related U.S. Application Data

(60) Provisional application No. 63/186,490, filed on May 10, 2021.

(58) Field of Classification Search
CPC . H04L 5/0048; H04B 7/06956; H04B 7/0404; H04B 7/0691
See application file for complete search history.

(56) References Cited

U.S. PATENT DOCUMENTS

| | | | |
|---|---|---|---|
| 2020/0267712 A1 | 8/2020 | Cirik et al. | |
| 2020/0359197 A1 | 11/2020 | Venugopal et al. | |
| 2022/0217654 A1* | 7/2022 | Kang | H04W 52/346 |
| 2022/0239440 A1* | 7/2022 | Go | H04L 5/0044 |
| 2022/0272674 A1* | 8/2022 | Go | H04B 7/0691 |

OTHER PUBLICATIONS

Fraunhofer Iis et al., "Enhancements on UE multi-beam operation," 3GPP TSG RAN WG1 Meeting #96-Bis, R1-1904217, Apr. 2019.
WIPO, International Search Report and Written Opinion for International Application No. PCT/IB2022/054289, Jul. 28, 2022.
EPO, Communication for EP Application No. 22806938.1, Jun. 11, 2025.
EPO, Communication for EP Application No. 22806938.1, Nov. 6, 2025.

* cited by examiner

200

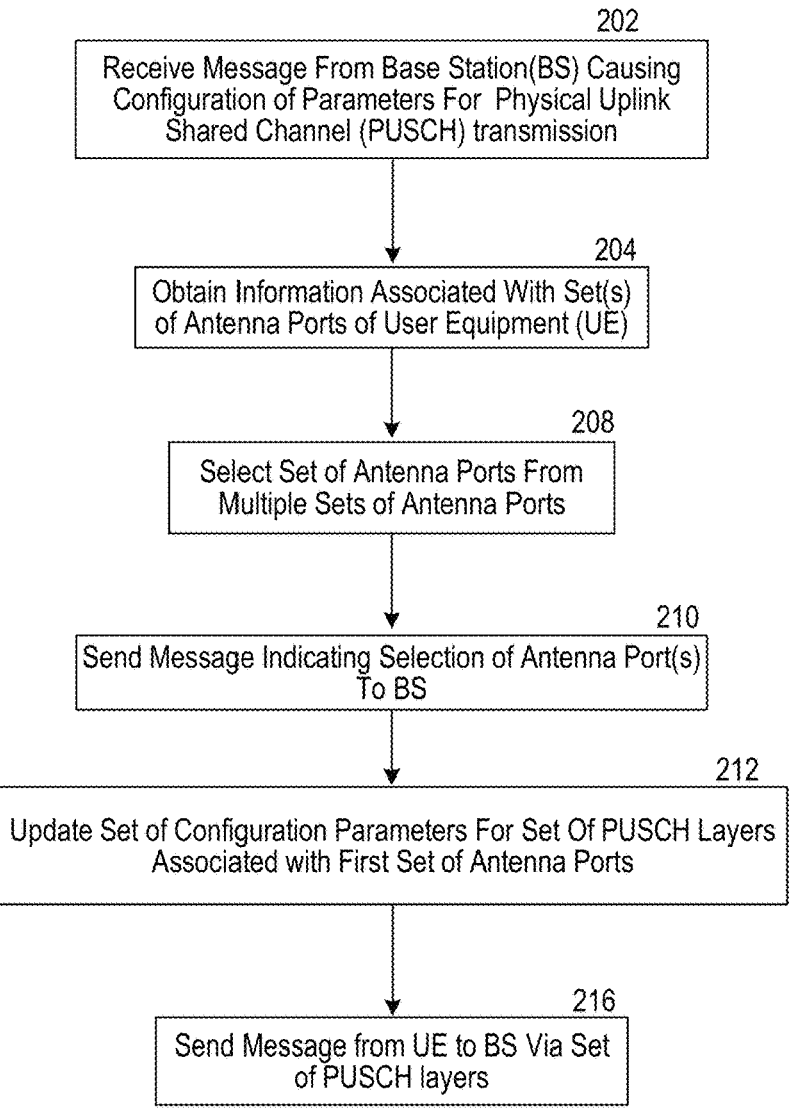

202

Receive Message From Base Station(BS) Causing Configuration of Parameters For Physical Uplink Shared Channel (PUSCH) transmission

204

Obtain Information Associated With Set(s) of Antenna Ports of User Equipment (UE)

208

Select Set of Antenna Ports From Multiple Sets of Antenna Ports

210

Send Message Indicating Selection of Antenna Port(s) To BS

212

Update Set of Configuration Parameters For Set Of PUSCH Layers Associated with First Set of Antenna Ports

216

Send Message from UE to BS Via Set of PUSCH layers

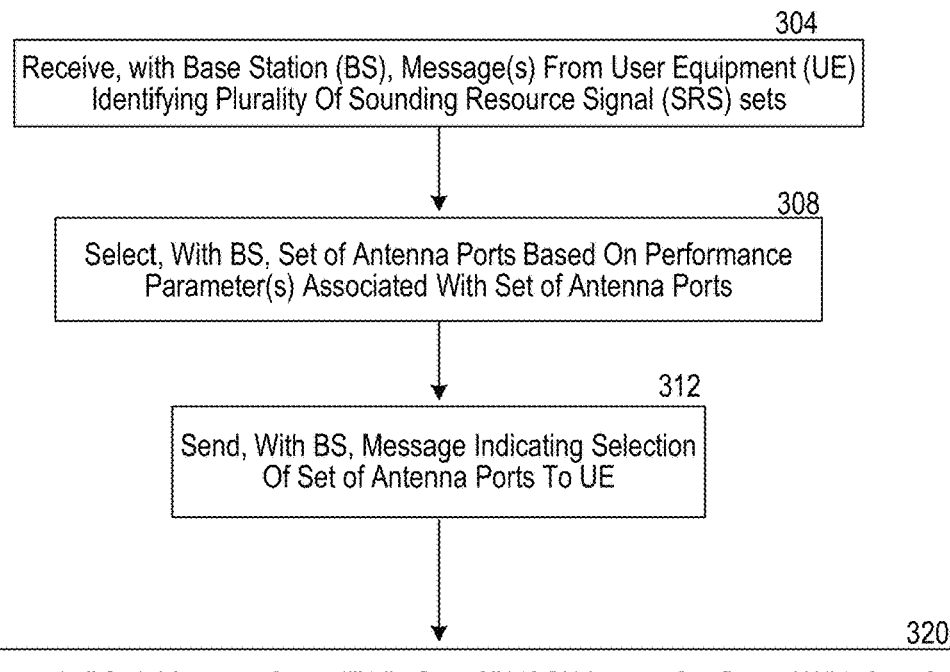

304

Receive, with Base Station (BS), Message(s) From User Equipment (UE) Identifying Plurality Of Sounding Resource Signal (SRS) sets

308

Select, With BS, Set of Antenna Ports Based On Performance Parameter(s) Associated With Set of Antenna Ports

312

Send, With BS, Message Indicating Selection Of Set of Antenna Ports To UE

320

Receive, At BS, A Message from UE Via Set of PUSCH Layers Configured With Set of Configuration Parameters For Set Of PUSCH Layers Associated with Set of Antenna Ports

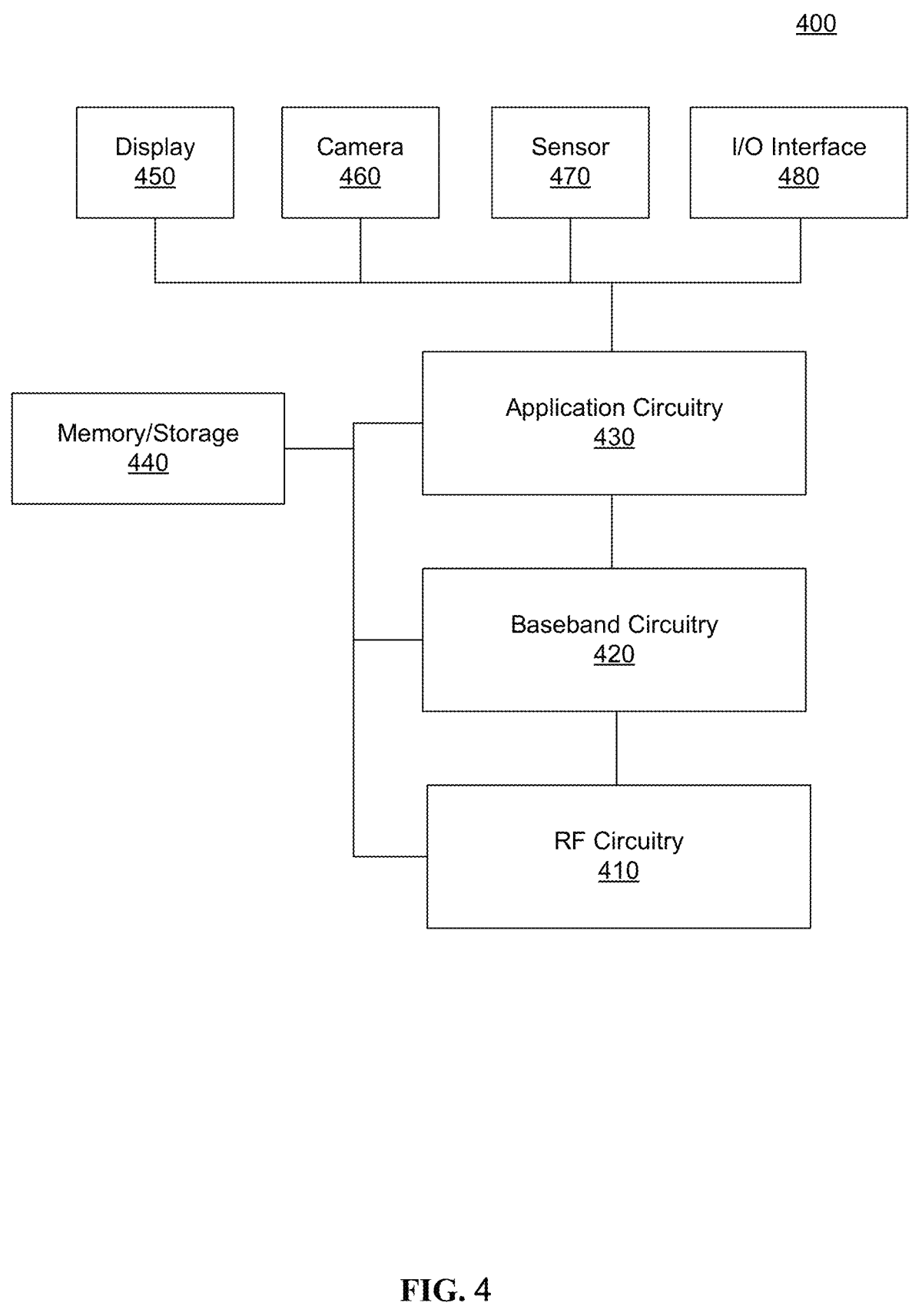

| Display 450 | Camera 460 | Sensor 470 | I/O Interface 480 |

Memory/Storage 440

Application Circuitry 430

Baseband Circuitry 420

RF Circuitry 410

FIG. 4

SIGNAL AND CHANNEL SELECTION WITH MULTIPLE PORTS

CROSS-REFERENCE TO RELATED APPLICATION(S)

This application is a continuation of International Application No. PCT/IB2022/054289, filed May 9, 2022, which claims priority to U.S. Provisional Application No. 63/186, 490, filed May 10, 2021, the entire disclosures of which are incorporated herein by reference.

TECHNICAL FIELD

This application relates to the communications field, and more specifically, to a method, a user equipment (UE), and a base station (BS).

BACKGROUND

New Radio (NR) technology is designed to provide and accommodate for significant increases in wireless network performance between base stations (BS) and user equipment (UE). These enhancements enable operations such as communicating high volumes of data, accessing distributed computing systems, and providing computing resources to other devices. However, these increases in bandwidth come at the cost of reduced signal penetration through materials and reduced effective ranges. NR technology incorporates the use of multi-beam technology to transmit data in the form of a plurality of directed beams projected from antennas in order to provide overcome penetration limitations and provide other benefits. Directed beams may focus communication signals towards the direction of UE, where the signals are received by a panel of antennas of a transmission and reception unit (TXRU) of the UE.

SUMMARY

In a first aspect, a method is provided. The method is performed by user equipment (UE) and includes obtaining information associated with sets of antenna ports comprising a first set of antenna ports and a second set of antenna ports, where the first set of antenna ports correspond with a first antenna panel of the UE, and where the second set of antenna ports correspond with a second antenna panel of the UE, selecting a target set of antenna ports of the sets of antenna ports based on a determination that information associated with the target set of antenna ports satisfies a set of criteria, in response to a selection of the target set of antenna ports, configuring UE configuration parameters associated with the target set of antenna ports to associate an uplink transmission with a set of PHYSICAL UPLINK SHARED CHANNEL (PUSCH) layers associated with the target set of antenna ports, and sending the uplink transmission to a base station (BS) via the set of PUSCH layers.

In a second aspect, a UE is provided. The UE includes: a first antenna panel controllable via a first set of antenna ports, a second antenna panel controllable via a second set of antenna ports, circuitry to perform operations including: obtaining information associated with sets of antenna ports comprising the first set of antenna ports and the second set of antenna ports, selecting a target set of antenna ports of the sets of antenna ports based on a determination that information associated with the target set of antenna ports satisfies a set of criteria, in response to a selection of the target set of antenna ports, configuring UE configuration parameters associated with the target set of antenna ports to associate an uplink transmission with a set of Physical Uplink Shared Channel (PUSCH) layers associated with the target set of antenna ports, and sending the uplink transmission to a base station (BS) over the set of PUSCH layers.

In a third aspect, a BS is provided. The BS includes: an antenna, and circuitry to perform operations including: obtaining information associated with sets of antenna ports comprising a first set of antenna ports and a second set of antenna ports, wherein the first set of antenna ports corresponds with a first antenna panel of user equipment (UE), and wherein the second set of antenna ports correspond with a second antenna panel of the UE, selecting a target set of antenna ports of the sets of antenna ports based on a determination that information associated with the target set of antenna ports satisfies a set of criteria, in response to a selection of the target set of antenna ports, sending a first message to the UE, where: the first message indicates the selection of the target set of antenna ports, and the first message causes the UE to use configuration parameters associated with the target set of antenna ports to enable communication of a set of PUSCH layers associated with the target set of antenna ports, and receiving a second message from the UE via the set of PUSCH layers.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 2 shows a flowchart of a process for using a UE computing system to select resources for communication between a UE and a BS, in accordance with one or more implementations of the present technology.

FIG. 3 shows a flowchart of a process for using a BS computing system to select resources for communication between a UE and a BS, in accordance with one or more implementations of the present technology.

FIG. 4 is a block diagram of a system for wireless communication, in accordance with one or more implementations of the present technology.

DETAILED DESCRIPTION

Figure 1:
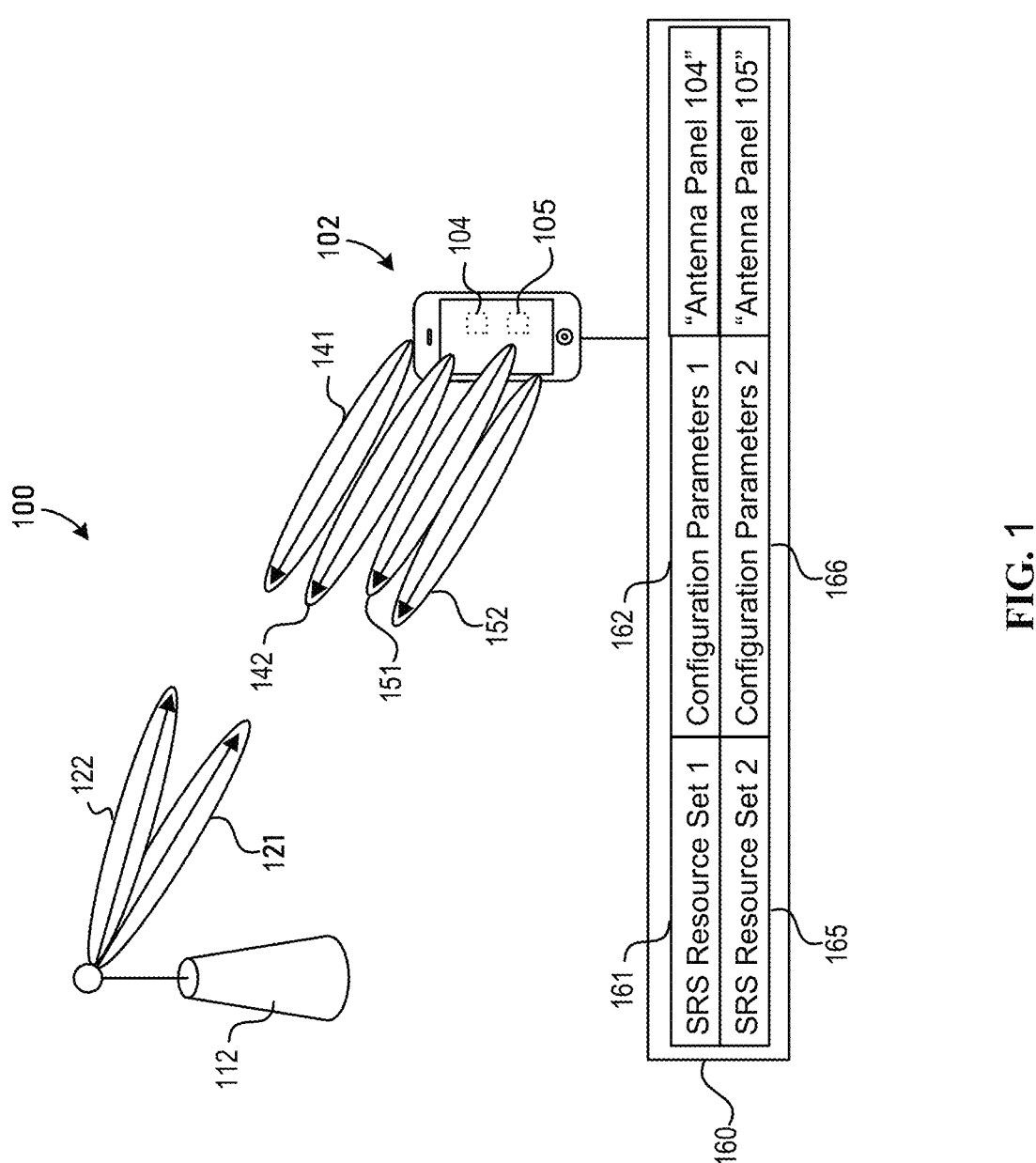
FIG. 1 shows an illustrative system for communication between a BS and multiple ports of user equipment, in accordance with one or more implementations of the present technology.

In the following description, for the purposes of explanation, numerous specific details are set forth in order to provide a thorough understanding of the implementations of the present technology. It will be appreciated, however, by those having skill in the art, that the implementations of the present technology may be practiced without these specific details or with an equivalent arrangement. In other cases, well-known structures and devices are shown in block diagram form in order to avoid unnecessarily obscuring the implementations of the present technology.

A communication system (e.g., Fifth Generation (5G) communication system) may rely on communication between a BS and a UE, such as cell phones, tablets, smart vehicles, or other mobile computing devices. A BS may include a node B, a next-generation node B (gNB), a new radio (NR) BS, or the like. The BS may configure a group of sounding reference signal (SRS) resource sets. Each SRS resource set may indicate points or ranges in a time or frequency domain used to send uplink messages, such as Physical Uplink Shared Channel (PUSCH) messages, from a UE. The SRS resources may be applied to different types of operations, such as channel state information (CSI) acquisition, beam management, antenna switching, or other communication-related operations. A system may determine the parameters for a planned SRS transmission based on the SRS resource set associated with the parameters. Furthermore, the SRS resources may be configured through a higher-layer parameter for each SRS resource set. For example, an SRS resource set may also be configured by setting a higher-layer parameter labeled "SRS-ResourceSet" to a value. For example, if an SRS resource set is configured with an operation type by setting the higher-layer parameter "SRS-ResourceSet" to the value "beamManagement," some implementations may allocate the SRS resources of that set for beam management operations.

Conventional systems and methods may configure an SRS resource for a codebook-based uplink message (e.g, a PUSCH transmission) to indicate an antenna port. However, such designs may be limited with respect to the number of SRS resource sets. For example, some implementations may be limited to configuring only one SRS resource set and thus be able to perform only one transmission configuration operation for a PUSCH. However, in many cases, a system may require a change in the configuration of PUSCH transmission in response to a specific UE uplink transmission implementation or a hardware change. In such cases, previous systems may be forced to use a radio resource control (RRC) message to reconfigure an SRS resource set to change the use of an antenna panel. Using an RRC message to reconfigure an SRS resource set may create latency or signaling overhead which may impair system performance.

Introduced therefore are techniques that include operations to overcome one or more of the issues described above or other issues by, for example, dynamically switching between different antenna panels of a UE during wireless communication. Some systems may configure a UE by updating UE configuration parameters based on parameter values. In some implementations, configuring the UE may cause the use of a selected panel of antennas for a planned message. For example, configuring the UE may cause the use of a selected panel of antennas to send an uplink message (e.g., a PUSCH transmission), where the selected panel of antennas corresponds with a specified SRS resource set selected from multiple other SRS resource sets. A system may include a UE, a BS, a combination of a UE or a BS, an electronic device that is part of a network connecting different BS, etc. For example, A UE may obtain a first set of SRS resources and a second set of SRS resources for codebook-based PUSCH transmission. In some implementations, different resource sets may correspond with different antenna ports for different antenna panels. For example, a first SRS resource set may correspond with a first set of antenna ports, and the second SRS resource set may correspond with a second set of antenna ports, where the first and second sets of antenna ports may be ports for different antenna panels. An antenna port may enable control of a corresponding antenna or reading from the corresponding antenna. In some implementations, The techniques may include obtaining associations between different resource sets and different configurations of parameters. For example, a UE may obtain an association between each SRS resource set and one or more uplink transmission configurations, where a transmission configuration may be represented as a set of UE configuration parameters or an identifier of the set of UE configuration parameters.

Also introduced in this disclosure are techniques that include selecting a set of antenna ports, corresponding antenna panel, or corresponding resource set based on an associated set of values. For example, a UE may select an SRS resource set or a specific SRS resource to transmit an SRS message based on parameters associated with the different SRS resource sets. A technique may also include selecting a resource set for a planned message that cause a UE to use a corresponding antenna panel via a corresponding set of antenna ports when sending the planned message. For example, after selecting a resource set, a UE may send a confirmation message indicating that an SRS resource set or an associated set of UE configuration parameters has been selected. The message may include various types of information that indicate the selection of an antenna port, an associated antenna panel, or an associated resource set. For example, a UE may send a message to a gNB, where the message may indicate that the UE has selected a first SRS resource set from a plurality of SRS resource sets. Before, during, or after sending the message, the UE may also update a set of uplink transmission configuration parameters with parameter values associated with the first SRS resource on a PUSCH transmission. In some implementations, an SRS resource indicator associated with the PUSCH transmission may also indicate an SRS resource in the first SRS resource set. Alternatively, in some implementations, a BS may perform operations described as being performed by the UE instead. For example, a BS may select an SRS resource to associate with an SRS resource. It should also be understood that, while this disclosure refers to PUSCH transmissions, the techniques described in this disclosure may apply to other types of message channels in 5G communication, such as Physical Uplink Control Channel (PUCCH) or Physical Random Access Channel (PRACH).

FIG. 1 shows an illustrative system for communication between a BS and multiple ports of user equipment, in accordance with one or more implementations of the present technology. The communication system 100 may support wireless communication between a UE 102 and a BS 112. The BS 112 may transmit the signals via transmit beams 121-123. Each transmit beam of the transmit beams 121-122 may be transmitted from the BS 112 to the UE 102. The UE 102 may include a first panel of antennas 104 or a second panel of antennas 105 to receive signals from the BS 112 or transmit signals to the BS 112. As described further below, the UE 102 may use the first panel of antennas 104 to send a first PUSCH transmission to the BS 112 via the first PUSCH layer 141 and the second PUSCH layer 142. Similarly, the UE 102 may use the second panel of antennas 105 to send a second PUSCH transmission to the BS 112 via the third PUSCH layer 151 and the fourth PUSCH layer 152. While the UE 102 is depicted as having two panels of antennas, implementations described in this disclosure may be applicable to a UE having more than two panels of antennas. Furthermore, while the first and second PUSCH transmissions are shown as having two channels, a PUSCH transmission may be sent via only one PUSCH layer or may be sent via more than two PUSCH layers in other implementations. As used in this disclosure, a PUSCH layer may be a physical layer for wirelessly transmitting PUSCH messages, where each PUSCH layer may be distinguished from other PUSCH layers based on a frequency, slot(s) in a time domain, etc.

The UE 102 may represent communication channels with the BS 112 in the form of SRS resource sets. The UE 102, the BS 112, or both can use the SRS resource sets to configure various types of communication operations between the UE 102 and the BS 112. The BS 112 may align beam directions for a downlink transmission to the UE 102 from the BS 112. Alternatively, or in addition, the UE 102 may align beam directions for an uplink transmission from the UE 102 to the BS 112. In some implementations, aligning a beam may include using SRS resources of the UE to perform the alignment. In some implementations, the UE 102, the BS 112, or a computing system accessible or usable by either the UE 120 or the BS 112 may determine a pairing between a BS reception beam and a UE transmission beam or a UE reception beam and a BS transmission beam, respectively. Furthermore, the UE 102 may store data represented by the box 160, where an SRS resource set may be stored in association with a corresponding set of UE configuration parameters and an associated antenna panel. For example, the SRS Resource Set 161 may be mapped to the UE configuration parameters 162 and the panel of antennas 104 (represented by the entry "Antenna Panel 104" in the box 160). Similarly, the SRS Resource Set 165 may be mapped to the UE configuration parameters 166 and the panel of antennas 105 (represented by the entry "Antenna Panel 105" in the box 160).

Each SRS resource of the UE 102 may be mapped to an antenna port connected an antenna of the panel of antennas 104 and the panel of antennas 105. In some implementations, each respective set of antenna ports of the panels of antenna 104-105 may represent a respective panel of antennas, where each panel may include various numbers of antenna ports, such as one, two, or four antenna ports. The UE 102 may allocate each SRS resource or a set of SRS resources to different use cases, such as CSI acquisition, beam management, or antenna switching. For example, The UE 102 may configure its antenna-switching operations by modifying a via higher-layer parameter for each SRS resource set. In some implementations, the types of operations that an SRS resource set can be applied to may be configured by a higher-layer parameter labeled as "SRS-ResourceSet." For example, the communication system 100 can associate or assign an SRS resource set with a usage value 'beamManagement.' Accordingly, the communication system 100 can use the corresponding SRS resources of the designated set for beam management by using the assigned usage value as an identifier or a trigger.

In some implementations, the UE 102 may obtain, from local memory or another memory accessible to the UE 102, first information associated with the first panel of antennas 104 and second information associated with the second panel of antennas 105. The information may include identifiers, metrics, history of use, etc. The UE 102 may then perform operations to determine which panel of antennas to use based on whether UE configuration parameters or other parameters associated with the panel of antennas satisfy a set of criteria. After selecting a target panel of antennas, the UE 102 may then send a message indicating the selection of the target antenna panel to the BS 112. For example, the UE 102 may send a first message indicating the selection of a first SRS resource set associated with the first SRS resource to the BS 112. The UE 102 may send the first message or other messages described in this disclosure to the BS 112 via an RRC signal, a MAC CE message, a physical uplink control channel (PUCCH) transmission, or another type of signal. In some implementations, the first SRS resource may correspond with the first panel of antennas 104. After sending the first message, the BS 112 may update some or all uplink transmission configuration parameters with parameter values associated with the first SRS resource on a scheduled PUSCH transmission from the UE 102. In some implementations, updating the UE configuration parameters with parameter values associated with the first SRS resource on the PUSCH transmission may include creating or modifying an SRS resource indicator associated with the PUSCH transmission.

Alternatively, in some implementations, the BS 112 may determine which panel of antennas of the UE 102 to allocate for a PUSCH transmission. The UE 102 may provide the BS 112 with multiple available SRS resource sets for the PUSCH transmission. The BS 112 may then select a target SRS resource set of the SRS resource sets for the PUSCH transmission and send a message to the UE 102 that the target SRS resource set has been selected. In some implementations, the message may include a request that causes the UE 102 to apply an uplink transmission configuration associated with the first SRS resource set on the PUSCH transmission. Applying a transmission configuration may include updating a set of configuration parameters with parameter values of the transmission configuration. Alternatively, or in addition, the request may cause the UE 102 to update the UE configuration parameters with the parameter values associated with the first SRS resource set, values associated with an SRS resource indicator that is associated with the PUSCH transmission. Or on another associated set of values. For example, the UE 102 may update an SRS resource indicator such that the SRS resource indicator indicates an SRS resource in the first SRS resource set.

In some implementations, an identifier, a parameter, a command, a script, etc. may include a request that causes a UE to configure a set of parameters for PUSCH transmission. Furthermore, a message sent from the BS 112 to the UE 102, such as a message indicating the selection of an SRS resource set, may be communicated via RRC signaling, a MAC control element (CE) message, Downlink Control (DCI) signaling, etc. For example, the BS 112 may communicate the selection of an SRS resource set for a PUSCH transmission to the UE 102 via RRC signaling.

Alternatively, the BS 112 may provide the UE 102 with an SRS resource set for a non-codebook-based PUSCH transmission. For example, the UE 102 may be provided with a first SRS resource set associated with one or more SRS resources. In some implementations, each respective SRS resource of an SRS resource set may be configured with one or more antenna ports. For the case of non-codebook-based transmission, a PUSCH transmission may be scheduled with various DCI formats. For example, a PUSCH transmission may be scheduled with DCI format 0_0, DCI format 0_1, DCI format 0_2, etc. In some implementations, the PUSCH transmission may be statically or semi-statically configured. In the case that the PUSCH transmission is scheduled with a DCI format 0_1, DCI format 0_2, or is semi-statically configured, the UE may determine a PUSCH precoder or transmission rank associated with the PUSCH transmission. The UE may also determine the PUSCH precoder or the transmission rank based on the set of SRS resource indicators to indicate the priority of use for SRS resources of the SRS resource set. For example, if a PUSCH is scheduled by a DCI format 0_1, a UE may determine an associated PUSCH precoder or transmission rank for two SRS resources configured in an SRS resource set associated with the scheduled PUSCH.

In some implementations, the UE 102 may generate or include a mapping between an indicated SRS resource indicator to an indicated demodulation reference signal (DM-RS) port and their corresponding PUSCH layer(s). The UE 102 may use these mapped antenna ports to send a PUSCH transmission over the corresponding PUSCH layers based on the UE configuration parameters associated with a selected SRS resource. For example, the corresponding PUSCH layers may be given by a DCI message formed in DCI format 0_1 or by the parameter "configuredGrantConfig." The UE 102 may arrange the mapping between PUSCH layers, antenna ports, and SRS resources based on a sequence of increasing order with respect to their respective indices or identifiers. In some implementations, the UE 102 may then send a PUSCH message to the BS 112 via the set of PUSCH layers using the set of antenna ports after a selection of the SRS resources associated with the set of antenna ports.

By permitting at least one of the UE 102 or the BS 112 to control and dynamically switch between uplink transmission configurations associated with different antenna panels of a UE, some implementations may reduce latency and the overhead of control signaling. For example, a computing system operating on the UE 102 or the BS 112 may select a first SRS resource set instead of a second SRS resource set based on a determination that parameters associated with the first SRS resource set satisfy a set of criteria. The set of criteria may include a criterion that a UE configuration parameter is set to a specified value, that a parameter satisfies a parameter threshold, etc. For example, the set of criteria may include a criterion that a maximal rank for PUSCH transmission is greater than a threshold, a criterion that a higher layer parameter is set to "codebook," etc. Unlike operations that require a complete reconfiguration of a UE's use of an antenna panel, switching to using a different panel may require far less overhead in a message and increase the available bandwidth for other communication operations.

In some implementations, the proposed solution for a non-codebook-based transmission may also provide additional flexibility for UE hardware implementations. For example, the set of criteria may include a codebook-filtering criterion that a specified higher layer parameter is not set to "codebook." The UE 102 or BS 112 may then select an SRS resource indicator associated with the second set of antennas 105 based on a determination that the parameters associated with the SRS resource indicator satisfy the codebook-filtering criterion. By performing such operations, some implementations may permit efficient switching between codebook-based and non-codebook-based PUSCH transmissions for a UE.

FIG. 2 shows a flowchart of a process 200 for using a UE (e.g., the UE 102 of FIG. 1) to select resources for communication between a UE and a BS, in accordance with one or more implementations. Some implementations may receive a message that causes the configuration of a set parameters for uplink transmission, as indicated by block 202. For example, A UE may receive a message from a BS (e.g., the BS 112 of FIG. 1) that causes a configuration of parameters for a PUSCH transmission. A UE may receive a wireless message that may request a PUSCH transmission from a UE, where the request may trigger a reconfiguration operation. Alternatively, a UE may receive a message that causes a set of configuration operations without triggering the UE to send a PUSCH transmission. For example, a UE may receive a DCI message that causes the UE to send a PUSCH transmission. Before sending the PUSCH transmission, the UE may select an antenna panel for the transmission using operations described herein.

Some implementations obtain information associated with the set of antenna ports, as indicated by block 204. For example, a UE may obtain information associated with multiple sets of antenna ports of the UE. In some implementations, a UE may obtain multiple sets of antenna ports by obtaining two or more SRS resource sets from a stored set of available antenna ports, where each resource set may be associated with codebook-based PUSCH transmissions. Alternatively, some or all of the resource sets may be associated with non-codebook-based PUSCH transmissions. In some implementations, each resource set may be associated with a corresponding set of antenna ports, where selecting a resource set includes selecting the corresponding set of antenna ports. For example, a UE may retrieve a first resource set corresponding with a first set of antenna ports and a second resource set corresponding with a second set of antenna ports from local storage. Additionally, the UE may obtain a respective identifier or other associated information for each respective set of antenna ports.

In some implementations, a resource set may include one resource. Alternatively, a resource set may include multiple resources. For example, a UE may include a first SRS resource set and a second SRS resource set, where the first SRS resource set includes a single SRS resource and the second SRS resource set includes multiple SRS resources. In some implementations, each resource set may be associated with a corresponding set of UE configuration parameters for PUSCH transmission. Such UE configuration parameters may include maximal uplink transmission power, full power transmission mode, maximal rank for PUSCH transmission, codebook subset, other configuration parameters, etc. For example, the first SRS resource set may be associated with a first type of codebook subset, and the second SRS resource set is associated with a second type of codebook subset. Alternatively, or in addition, each respective SRS resource of the SRS resource may be associated with their own respective configuration parameters, where the different SRS resources may share some of the same configuration parameters.

While the above describes some UE configuration parameters that may be used to configure a PUSCH transmission, other UE configuration parameters may be used. For example, the set of configuration parameters may include a higher-layer parameter to indicate a codebook subset, a higher-layer parameter to indicate associations with other reference signals, etc. Alternatively, or in addition, the set of configuration parameters may include a maximal transmit power, a maximal count of layers in PUSCH transmission (i.e., maximal rank), a scramble identity for PUSCH transmission, transaction configuration, a DM-RS type, a PUSCH power control parameter, a configuration of PUSCH a frequency hopping, a type of PUSCH of resource allocation, a PUSCH aggregation factor, a configuration of an MCS table, whether the variable "transformPrecoder" or another variable is enabled or disabled, the size of color RGB data, a PUSCH time domain allocation list, etc.

In some implementations, the UE configuration parameters may control the frequency or context of an SRS transmission. For example, a UE may utilize a higher-layer parameter, such as "resourceType," to determine whether an SRS transmission is to be sent periodically or semi-persistently. Alternatively, a UE may use the parameter "resourceType" to cause the SRS transmission to be aperiodic. For example, a UE may receive instructions to configure an SRS resource by updating the "resourceType" parameter associated with the SRS resource with the value "periodic." In response, a UE may periodically send a PUSCH transmission associated with the SRS resource to a BS.

In some implementations, a UE may store identifiers, parameters, or other information characterizing a resource set or corresponding set of antenna ports in a local memory of the UE. Alternatively or additionally, the memory may store associations between SRS resource sets, parameters, indicators, antenna panels, channels, etc. The UE may then obtain the identifiers, associated parameters, or other associated information when the UE is instructed to send a PUSCH transmission to a BS.

Some implementations may select a target set of antenna ports from the multiple sets of antenna ports, as indicated by block 208. For example, the UE may select a target set of antenna ports from the multiple sets of antenna ports using a computing resource of the UE. In some implementations, the UE may use a logic, a processor, or another type of circuitry to execute program code that causes the UE to select a target set of antenna ports based on information associated with the target set of antenna ports. In some implementations, a system may select a target set of antenna ports by selecting a corresponding SRS resource set or configuration associated with the target set of antenna ports. For example, each respective set of antenna ports may be set of ports for a distinct antenna panel of a UE associated with a respective SRS resource set. A UE may then select one of the antenna panels for use by selecting its associated resource set. In some implementations, a UE may select resource sets or configurations based on the parameters associated with the resource set or configuration. Furthermore, a UE may select a target SRS resource set instead of other SRS resource sets based on a determination that the target SRS resource set is associated with a set of parameters that satisfy one or more criteria.

In some implementations, a UE may use or compare information such as parameter values of configuration parameters, performance metrics, identifiers, or other information when applying a set of criteria to select a target set of antenna ports. For example, a UE may compare a maximal transmit power associated with a first SRS resource set with other values of maximal transmit power for other SRS resource sets. The UE may then select a first SRS resource set instead of a second SRS resource set based on a determination that the maximal transmit power associated with the first SRS resource set is greater than maximal transmit power values of other SRS resource sets, where the set of criteria includes a requirement that the maximal transmit power is greater than other maximal transmit powers. Alternatively, a UE may select the second SRS resource based on a determination that the second SRS resource has a maximal transmit power that is within a target range of values. In some implementations, a UE may select an SRS resource set based on a determination that a higher-layer parameter indicates that the selected SRS resource set is labeled as configured in accordance with a target codebook subset. Furthermore, while the above describes selecting SRS resource sets based on maximal transmit power or codebook subset types, other configuration parameters may be used when selecting an SRS resource set, such as parameters described in this disclosure. In addition, various other criteria may be used, such as a minimum value for a parameter value, a first encountered value satisfying a threshold, etc.

In some implementations, a UE may obtain a set of instructions or values that will cause the UE to select resource sets when certain conditions are met based on information associated with the resource sets. For example, the UE may obtain a configuration grant from a base station that causes the UE to select a target SRS resource set if a first criterion is satisfied by information (e.g., a configuration parameter value, a history of use, etc.) associated with the target SRS resource. a UE may use the previously-obtained set of instructions or values to select a set of antenna ports, associated SRS resource set, or associated configuration. For example, a UE may use values in a configuration grant of a UE to select a first resource set instead of a second resource set, where values may represent configuration parameters, thresholds, or other values for a set of criteria. Alternatively, or in addition, a UE may use SRS reference indicators or other identifiers of a grant to identify or categorize groups of values when selecting SRS resource sets, associated sets of configuration parameters, associated antenna panels, etc.

Some implementations may send a message indicating the selection of a set of antenna ports, as indicated by block 210. For example, a UE may send a message indicating the selection of a set of antenna ports to the BS. The UE may indicate to the BS that it has selected a set of antenna ports by sending a reporting message to the BS. The UE may use various protocols or formats to send a reporting message, where the information encoded in the reporting message may vary based on specific applications or operational needs. For example, a UE may report the selection of a set of antenna ports by reporting an SRS reference indicator identifying an SRS resource set associated with the set of antenna ports. Alternatively, or in addition, a UE may report the selection of a set of antenna ports by reporting an identifier or other information for a PUSCH transmission configuration or a parameter(s) of the PUSCH transmission configuration. In some implementations, the UE may report the selection of a set of antenna ports of a UE using RRC signaling, a MAC CE message, or another PUSCH transmission.

In some implementations, a BS may update a BS antenna configuration after receiving a reporting message indicating the selection of an SRS resource set, a resource configuration, or a set of antenna ports. The BS may perform operations such as selecting a new antenna to send a directed beam, modifying the transmission power of the antenna, modifying a message format, switching to a different protocol, etc. For example, the BS may change a beam frequency to a value stored in association with a selected SRS resource set.

Some implementations may update a set of configuration parameters for an uplink transmission channel associated with the selected set of antenna ports, as indicated by block 212. For example, a UE may update a set of UE configuration parameters for a set of PUSCH layers associated with the selected set of antenna ports. In some implementations, the UE may be triggered to configure future PUSCH transmissions with a set of parameters after selecting a resource set associated with the set of parameters. Configuring the UE may include updating the values of UE configuration parameters, updating switching variables that cause a UE to use a first antenna panel instead of a second antenna panel to send a PUSCH transmission, etc.

As described elsewhere, a UE may communicate the selection of an SRS resource using a first PUSCH transmission. The UE configuration parameters associated with a first PUSCH transmission used to communicate the selection of a resource set may be different from the UE configuration parameters for a second PUSCH transmission associated with the selected resource set. For example, a UE may communicate the selection of an SRS resource set using a first PUSCH transmission. A first panel of antennas associated with a corresponding first set of PUSCH transmission layers may send this first PUSCH transmission. The first set of UE configuration parameters for this first PUSCH transmission may be determined from a previous selection, a default configuration, a message sent from a BS, etc. After selecting the resource set, the UE may update a second set of UE configuration parameters for sending a second PUSCH transmission. The second set of UE configuration parameters may cause the UE to use a second panel of antennas associated with a corresponding second set of PUSCH layers to send the second PUSCH transmission. By using different sets of antenna ports to communicate with the first and second PUSCH transmission, a UE may perform operations described in this disclosure using PUSCH layers instead of RRC or MAC CE messages. In some embodiments, using multiple PUSCH transmissions instead of using an RRC message or another format or protocol may be advantageous when these the respective channel, slot(s), formats, or protocols are reserved for other operations. Furthermore, while the above example describes a UE having two panels of antennas, a UE may include some other number of panels, such as at least three panels of antennas. For example, a UE may include four panels of antennas, where each panel is associated with its own respective set of antenna ports.

In some implementations, a UE may set the configuration parameters for various types of PUSCH transmissions, such as a type 1 PUSCH transmission or a type 2 PUSCH transmission. For example, a UE may configure a type 1 PUSCH transmission with a configure grant after a BS sends an indicator of an SRS resource set in the configuration for the configuration grant. In some implementations, the indicator may be or otherwise include an SRS resource indicator identifying an SRS resource, where the SRS resource may be included in an SRS resource set. For example, a BS may send an SRS resource indicator to a UE, where the UE may then allocate an SRS resource indicated by the SRS resource indicator for PUSCH transmission. Similarly, a UE may configure a type 2 PUSCH transmission, where a BS may provide a UE with an SRI in a DCI message, where the SRI may then trigger the type 2 PUSCH transmission after the UE configures the type 2 PUSCH transmission based on configuration parameters associated with the SRS resource indicator.

In some implementations, each layer of a set of PUSCH layers for a PUSCH transmission may be allocated to or otherwise associated with an SRS resource indicated by an SRS resource indicator. In some implementations, the UE may perform a mapping of a set of indicated SRS resource indicators to a corresponding set of DM-RS ports. In some implementations, a UE may perform a one-to-one mapping from an indicated SRS resource indicator to an indicated DM-RS port and their corresponding PUSCH layer. In some implementations, the mapping may be based on a DCI format 0_1 message or by values of a set of parameters labeled as "configuredGrantConfig." In some implementations, a UE may sort the mapping between indicated SRS resource indicators and DM-RS ports or their associated PUSCH layers in increasing order of an SRS resource and their corresponding antenna ports. For example, an SRS resource indicator "a" may be mapped to a port "1" of a selected antenna panel, and an SRS resource "b" may be mapped to a port "2" of the selected antenna panel. In some implementations, the number of DM-RS ports and the number of corresponding PUSCH layers may be equal to the number of antenna ports associated with an indicated SRS resource.

For example, a UE may obtain a first indicated SRS resource indicator and a second indicated SRS resource indicator. The UE may then map the first indicated SRS resource indicator to a first DM-RS port and map the second indicated SRS resource indicator to a second DM-RS port. Furthermore, the UE may assign a precoder or transmission rank to the PUSCH layer associated with the respective resource in response to the mapping operation.

In some implementations, a UE may obtain an SRS resource set for non-codebook-based PUSCH transmission. For example, a UE may obtain a first SRS resource set having one or more SRS resources, where the SRS resource may be configured in association with one or more antenna ports. In the case of non-codebook-based PUSCH transmission, a push transmission may be scheduled by a DCI using one of various DCI formats, such as DCI format 0_0, DCI format 0_1, DCI format 0_2. Alternatively, or in addition, the UE may be semi-statically configured to operate and select an SRS resource for non-codebook-based putsch transmission. For example, a BS may send an RRC message to a UE that causes the UE to implement a semi-static configuration, where the semi-static configuration causes the UE to select different SRS resource sets or their associated set of antenna ports based on the UE configuration parameters of the semi-static configuration.

In some implementations, a UE may perform additional configuration operations when preparing to send a non-codebook-based PUSCH transmission. For example, a UE may first receive an SRS resource indicator for an SRS resource of a set of SRS resources. The UE may then determine a PUSCH precoder or transmission rank. In some cases, a set of SRS resources may include multiple SRS resources. In some implementations, a UE may determine the PUSCH precoder or transmission rank based on a specific SRS resource indicated by the SRS resource indicator. For example, a UE may determine a corresponding PUSCH precoder or transmission rank for each resource after receiving a DCI message scheduling a PUSCH transmission, where the DCI message is formatted in DCI format 0_1 or DCI format 0_2.

Some implementations may send a message via the set of uplink transmission channel, as indicated by block 216. For example, a UE may send a PUSCH transmission to the BS using the set of PUSCH layers. In some implementations, the UE may send a PUSCH transmission to the BS using the set of PUSCH layers associated with a set of antenna ports selected by the UE. As described elsewhere in this disclosure, some implementations may select a set of antenna ports by selecting an SRS resource set, where each respective resource of the SRS resource set may correspond with a respective antenna port and a respective PUSCH layer of a PUSCH transmission. After selecting the SRS resource set, some implementations may then send a PUSCH transmission via the SRS resource set. For example, some implementations may send a PUSCH transmission that is communicated across multiple layers, where the multiple layers may include a first PUSCH layer and a second PUSCH layer.

As described elsewhere in this disclosure, different SRS resources may map to different numbers of antenna ports. For example, a UE may include a first SRS resource and a second SRS resource, where the first SRS resource may map to a first antenna port and a second antenna port, and where the second SRS resource maps to a third antenna port. The first SRS resource and its associated pair of antenna ports may correspond with a pair of layers of a PUSCH transmission that can be sent from the UE. For example, the first antenna port may correspond with the first PUSCH layer, and the second antenna port may correspond with the second PUSCH layer. Similarly, the second SRS resource and its associated third antenna port may correspond with a third layer of the PUSCH transmission and a third associated port of the BS. By permitting different operations to select either a pair of antennas, a single antenna, or some other number of antenna ports (e.g., four antennas) when sending a PUSCH transmission, some implementations described in this disclosure may increase the versatility of wireless UE communication.

FIG. 3 shows a flowchart of a process 300 for using a BS (e.g., the BS 112) to select resources for communication between a UE (e.g., the UE 102 of FIG. 1) and a BS, in accordance with one or more implementations. Some implementations may receive a set of messages identifying a plurality of resource sets, as indicated by block 304. For example, a BS may receive a message or multiple messages from a UE identifying a plurality of SRS resource sets. In some implementations, a UE may transmit information of SRS resource sets to a BS, where the identifiers of SRS resource sets may be associated with different sets of UE configuration parameters. Alternatively, or in addition, a UE may transmit a device identifier to the BS, where the device identifier may be stored in association with a set of SRS resources, stored UE configuration parameter values, etc. in a memory/storage of the BS. After receiving the device identifier, a BS may retrieve the stored parameter values, SRS resources, or other associated values.

Some implementations may select a target set of antenna ports based on value(s) associated with the plurality of resource sets, as indicated by block 308. In some implementations, the BS may select a target set of antenna ports of multiple sets of antenna ports associated with the plurality of SRS resource sets based on performance parameter(s) or another value(s) associated with the target set of antenna ports. In some implementations, a BS may use a processor to select an SRS resource set provided by a UE, an associated set of configuration parameters, or another set of values mapping to a set of antenna ports of a UE. After selecting a set of antenna ports of a UE for PUSCH transmission, the BS may send a message to the UE indicating this selection. In some implementations, the BS may send a message indicating the selection of an SRS resource set or a corresponding set of antenna ports via RRC signaling or a MAC CE message. Alternatively, or in addition, a BS may indicate the selection of an SRS resource set or a corresponding set of internal ports via DCI signaling in some implementations For example, in some implementations, a UE may obtain two sets of PUSCH transmission configuration parameters. Each respective set of the two sets of configuration parameters may be associated with an SRS resource set. For codebook-based transmission, where there may be one or more SRS resources within that set. In some implementations, the SRS resource set includes or is otherwise associated with a higher-layer parameter that has a parameter value 'codebook.' As described elsewhere in this disclosure, a UE may accommodate both codebook and non-codebook communication. By setting a first SRS resource to be associated with the parameter value 'codebook,' a BS may distinguish this first SRS resource from a second SRS resource also available to a UE that is allocated for non-codebook communication. Furthermore, as described elsewhere in this disclosure, various other configuration parameters may be used to configure a PUSCH transmission, such as a configuration parameter of the set of configuration parameters described for block 204 of the process 200.

In some implementations, a BS may obtain identifiers of different SRS resource sets that indicate that a first SRS resource set is a codebook-based resource set and that a second SRS resource set is a non-codebook-based resource set. The BS may then select a first SRS resource set of a UE instead of a second SRS resource set based on a determination that the first SRS resource set is labeled as "codebook" based on a higher-layer parameter value associated with the first SRS resource set. Alternatively, a BS may select the second SRS resource set of the UE instead of the first SRS resource set based on a determination that the second SRS resource set is not labeled as "codebook" based on a higher-layer parameter value associated with the second SRS resource set. Furthermore, as described elsewhere in this disclosure, while some implementations may use a computing resource of a BS to select a set of SRS resources, a set of configuration parameters, or another set of values associated with a set of antenna ports of a UE, some implementations may perform such a selection using circuitry of the UE.

Some implementations may send a message indicating a selection of a set of antenna ports, as indicated by block 312. For example, the BS may send a message indicating the selection of the set of antenna ports to the UE. In some implementations, the BS may send a message indicating the selection of a set of antenna ports by communicating an SRS resource indicator to the UE via wireless message. The wireless message may be sent in the form of an RRC message, a DCI signaling message, or a MAC CE message. For example, a BS may first select a second SRS resource set from a group of resource sets that includes a first and second set of SRS resources. The BS may then send, to a UE, a DCI signaling message that includes an SRS resource indicator identifying the second set of SRS resources. Alternatively, or in addition, the BS may receive other information (e.g., identifiers) that is mapped to or otherwise associated with a set of antenna ports of the UE. Furthermore, the BS may directly send information indicating associations between an SRS resource set and a set of configuration parameters from a UE.

Some implementations may receive the message via an uplink transmission channel configured with a set of parameter values associated with the selected set of antenna ports, as indicated by block 320. For example, a BS may receive a message via set of PUSCH layers configured with a set of configuration parameter values for the set of PUSCH layers associated with the set of antenna ports. In some implementations, a UE may perform operations such as those described for block 212 to configure a planned PUSCH transmission. For example, after receiving an SRS resource indicator representing a selection of a corresponding SRS resource, a UE may update a set of UE configuration parameters with parameter values associated with the SRS resource, where the set of UE configuration parameters may include a maximal transmit power or a maximal transmit rank. As described elsewhere in this disclosure, a configuration operation with the set of UE configuration parameters may cause a UE to use an associated set of antenna ports when sending a PUSCH transmission to a BS. In some implementations, the BS may receive the PUSCH transmission after the PUSCH transmission is sent from the UE.

FIG. 4 is a block diagram of a system for wireless communication, in accordance with one or more implementations. FIG. 4 is a block diagram of an example system 400 (e.g., the UE 102 of FIG. 1 and/or the BS 112 of FIG. 1) for wireless communication according to an implementation of the present disclosure. Implementations described herein may be implemented into the system using any suitably configured firmware, hardware, or software. FIG. 4 illustrates the system 400 including a radio frequency (RF) circuitry 410, a baseband circuitry 420, an application circuitry 430, a memory/storage 440, a display 450, a camera 460, a sensor 470, and an input/output (I/O) interface 480, coupled with each other at least as illustrated. For example, the system 400 may use the RF circuitry 410 to send wireless messages, such as a PUSCH transmission.

The application circuitry 430 may include a circuitry, such as, but not limited to, one or more processing devices (e.g., a digital processor, a single-core processor, a multi-core processor, an analog processor, a digital circuit designed to process information, an analog circuit designed to process information, a state machine, or other mechanisms for electronically processing information). The processors may include any combinations of general-purpose processors and dedicated processors, such as graphics processors and application processors. The processors may be coupled with the memory/storage 440 and configured to execute instructions stored in the memory/storage 440 to enable various applications or operating systems running on the system. The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. For example, it should be noted that any of the computer devices of a UE discussed in this disclosure could be used to perform one or more of the operations described in of the process 200. Furthermore, any computer device discussed in this disclosure could be used to perform one or more of the operations in of the process 300.

The baseband circuitry 420 may include a circuitry, such as, but not limited to, one or more single-core or multi-core processors, logic circuits, or the like. The baseband circuitry 420 may include a baseband processor. The baseband circuitry 420 may handle various radio control functions that enable communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EUTRAN) or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 420 may include circuitry to operate with signals that are not strictly considered as being in a baseband frequency. For example, in some implementations, baseband circuitry may include circuitry to operate with signals having an intermediate frequency, which is between a baseband frequency and a radio frequency.

The RF circuitry 410 may enable communication with wireless networks using modulated electromagnetic radiation through a non-solid medium. In various implementations, the RF circuitry may include antennas, switches, filters, amplifiers, control logic, etc. to facilitate the communication with the wireless network. For example, the RF circuitry 410 can include a front-end device that processes the baseband signal to generate an outgoing signal or generate the baseband signal from a received signal.

In various implementations, the RF circuitry 410 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, or the application circuitry. As used herein, "circuitry" may refer to, be part of, or include an Application Specific Integrated Circuit (ASIC), an electronic circuit, a processor (shared, dedicated, or group), or a memory (shared, dedicated, or group) that execute one or more software or firmware programs, a combinational logic circuit, or other suitable hardware components that provide the described functionality. In some implementations, the electronic device circuitry may be implemented in, or functions associated with the circuitry may be implemented by, one or more software or firmware modules.

In some implementations, some or all of the constituent components of the baseband circuitry, the application circuitry, or the memory/storage may be implemented together on a system on a chip (SOC).

The memory/storage 440 may be storage media used to load and store data or instructions. The memory/storage for one implementation may include any combination of suitable volatile memory, such as dynamic random access memory (DRAM), or non-volatile memory, such as flash memory. Each of the devices described in this disclosure may include electronic storages such as the memory/storage 440 or other types of electronic storage. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). An electronic storage may store software algorithms, information determined by the processors, information obtained from servers, information obtained from client devices, or other information that enables the functionality as described herein.

In various implementations, the I/O interface 480 may include one or more user interfaces designed to enable user interaction with the system or peripheral component interfaces designed to enable peripheral component interaction with the system. With respect to the components of computer devices described in this disclosure, each of these devices may receive content and data via input/output (i.e., "I/O") paths. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

Devices described in this disclosure may also include processors or control circuitry to send and receive commands, requests, and other suitable data using the I/O paths. The control circuitry may comprise any suitable processing, storage, or input/output circuitry. Further, some or all of the computer devices described in this disclosure may include a user input interface or user output interface (e.g., a display) for use in receiving and displaying data. In some implementations, a display such as a touchscreen may also act as user input interfaces. It should be noted that in some implementations, one or more devices described in this disclosure may have neither user input interface nor displays and may instead receive and display content using another device (e.g., a dedicated display device such as a computer screen or a dedicated input device such as a remote control, mouse, voice input, etc.). Additionally, one or more of the devices described in this disclosure may run an application (or another suitable program) that performs one or more operations described in this disclosure.

In various implementations, the sensor 470 may include one or more sensing devices to determine environmental conditions or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry or RF circuitry to communicate with components of a positioning network, e.g., a global positioning system (GPS) satellite.

In various implementations, the display 450 may include a display, such as a liquid crystal display and a touch screen display. In various implementations, the system 400 may be a mobile computing device such as, but not limited to, a laptop computing device, a tablet computing device, a netbook, an ultrabook, a smartphone, etc. In various implementations, system may have more or less components, or different architectures. Where appropriate, methods described herein may be implemented as a computer program. The computer program may be stored on a storage medium, such as a non-transitory storage medium.

In some implementations, the various devices and subsystems illustrated in FIG. 1 or FIG. 4 may include one or more computer devices that are programmed to perform the functions described herein. The computing devices may include one or more electronic storages one or more physical processors programmed with one or more computer program instructions, or other components. The computing devices may include communication lines or ports to enable the exchange of information with a set of networks or other computing platforms via wireless techniques. The network may include the Internet, a mobile phone network, a mobile voice or data network (e.g., a 5G or LTE network), or other types of communications networks or combinations of communications networks. The computing devices may include additional communication paths linking a plurality of hardware, software, or firmware components operating together. The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions by software; hardware; firmware; some combination of software, hardware, or firmware; or other mechanisms for configuring processing capabilities on the processors.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the scope of the appended claims. For example, it is to be understood that the present technology contemplates that, to the extent possible, one or more features of any implementation may be combined with one or more features of any other implementation.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

As used throughout this application, the word "may" is used in a permissive sense (i.e., meaning having the potential to), rather than the mandatory sense (i.e., meaning must). Furthermore, unless otherwise indicated in this disclosure, use of the word "or" may be inclusive. For example, a set of items including "X" or "Y" may include only "X," only "Y," or both "X" and "Y." The words "include", "including", and "includes" and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Obtaining data may include generating a request for the data and receiving the data from a data source in response to the request. Alternatively, or in addition, obtaining data may include receiving the data from a data source without generating a request for the data.

Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. As used in this disclosure, a "set" of items may describe a single item or a plurality of items.

Although certain aspects of the technology are presented below in certain claim forms, the applicant contemplates the various aspects of the technology in any number of claim forms. Accordingly, the applicant reserves the right to pursue additional claims after filing this application to pursue such additional claim forms, in either this application or in a continuing application.

Enumerated Implementations

The present techniques will be better understood with reference to the following enumerated implementations:

1. A method comprising: obtaining information associated with sets of antenna ports comprising a first set of antenna ports and a second set of antenna ports, wherein the first set of antenna ports correspond with a first antenna panel of user equipment (UE), and wherein the second set of antenna ports correspond with a second antenna panel of the UE; selecting a target set of antenna ports of the sets of antenna ports based on a determination that information associated with the target set of antenna ports satisfies a set of criteria; in response to a selection of the target set of antenna ports, configuring UE configuration parameters associated with the target set of antenna ports to associate an uplink transmission with a set of Physical Uplink Shared Channel (PUSCH) layers associated with the target set of antenna ports; and sending the uplink transmission to a base station (BS) via the set of PUSCH layers.

2. The method of implementation 1, wherein: obtaining the information associated with the sets of antenna ports comprises obtaining the information associated with the sets of antenna ports from a local memory of the UE; and selecting the target set of antenna ports comprises sending a reporting message indicating the selection of an SRS resource set for a PUSCH transmission to the BS, wherein receiving the reporting message causes the UE to configure an antenna parameter of the UE to receive the PUSCH transmission.

3. The method of any of implementations 1 to 2, wherein selecting the target set of antenna ports comprises selecting the target set of antenna ports using a selection logic of the UE.

4. The method of any of implementations 1 to 3, wherein the UE comprises at least three antenna panels, and wherein the at least three antenna panels comprise the first antenna panel and the second antenna panel.

5. The method of any of implementations 1 to 4, wherein: sending the uplink transmission comprises sending a PUSCH transmission; selecting the target set of antenna ports comprises selecting an SRS resource set; the SRS resource set is associated with a set of UE configuration parameters; selecting the SRS resource set causes the UE to configure the PUSCH transmission based on the set of UE configuration parameters.

6. The method of implementation 5, wherein the set of UE configuration parameters comprises at least one of a maximal transmit power or a maximal number of layers in a PUSCH.

7. A user equipment (UE) system comprising: a first antenna panel controllable via a first set of antenna ports; a second antenna panel controllable via a second set of antenna ports; circuitry to perform operations comprising: obtaining information associated with sets of antenna ports comprising the first set of antenna ports and the second set of antenna ports; selecting a target set of antenna ports of the sets of antenna ports based on a determination that information associated with the target set of antenna ports satisfies a set of criteria; in response to a selection of the target set of antenna ports, configuring UE configuration parameters associated with the target set of antenna ports to associate an uplink transmission with a set of Physical Uplink Shared Channel (PUSCH) layers associated with the target set of antenna ports; and sending the uplink transmission to a base station (BS) over the set of PUSCH layers.

8. The system of implementation 7, wherein: the set of PUSCH layers is associated with a Type 1 PUSCH transmission; selecting the target set of antenna ports comprises sending an indicator of an SRS resource set associated with the target set of antenna ports to the BS.

9. The system of any of implementations 7 to 8, the operations further comprising: receiving a configured grant comprising an SRS resource indicator, wherein selecting the target set of antenna ports comprises selecting the target set of antenna ports based on the SRS resource indicator; and sending, to the BS, a reporting message comprising the SRS resource indicator, wherein receiving the reporting message causes the BS to update a BS antenna configuration based on parameters associated with the SRS resource indicator.

10. The system of any of implementations 7 to 9, wherein the target set of antenna ports comprises a plurality of antenna ports, wherein each antenna port of the target set of antenna ports is associated with a different layer of the set of PUSCH layers.

11. The system of any of implementations 7 to 10, wherein: the set of PUSCH layers is associated with a Type 2 Physical Uplink Shared Channel transmission; and the operations further comprise receiving a DCI message comprising an SRS resource indicator, wherein: selecting the target set of antenna ports comprises selecting the target set of antenna ports based on a determination that the target set of antenna ports is associated with the SRS resource indicator; and associating a SRS resource identified by the SRS resource indicator with the Type 2 Physical Uplink Shared Channel transmission.

12. The system of any of implementations 7 to 11, wherein: the uplink transmission is a first PUSCH transmission; and selecting the target set of antenna ports comprises sending, using the second set of antenna ports, a second PUSCH transmission comprising a first identifier of a first resource set to the BS.

13. The system of any of implementations 7 to 12, wherein: the target set of antenna ports is associated with a first SRS resource set; the first SRS resource set comprises a first SRS resource and a second SRS resource; the target set of antenna ports is associated with a second SRS resource set, wherein the second SRS resource set comprises a third SRS resource and a fourth SRS resource; the operations further comprising receiving a DCI; selecting the target set of antenna ports comprises selecting the target set of antenna ports in response to receiving the DCI by: determining whether multiple SRS resources are associated with the first SRS resource set; in response to a determination that the multiple SRS resources are associated with the first SRS resource set, determining a PUSCH precoder and transmission rank based on the information associated with the target set of antenna ports.

14. The system of implementation 13, wherein the DCI is formed in a DCI format 0_1 or a DCI format 0_2.

15. The system of any of implementations 13 to 14, wherein each respective PUSCH layer of the set of PUSCH layers corresponds with a respective resource of the first SRS resource set.

16. The system of any of implementations 7 to 15, the operations further comprising wherein: the target set of antenna ports is selected based on an initial message received via an RRC from the BS, wherein: the initial message causes a semi-static configuration of PUSCH layers; and the semi-static configuration causes the UE to select the target set of antenna ports.

17. A base station (BS) system comprising: an antenna; and circuitry to perform operations comprising: obtaining information associated with sets of antenna ports comprising a first set of antenna ports and a second set of antenna ports, wherein the first set of antenna ports corresponds with ports of a first antenna panel of user equipment (UE), and wherein the second set of antenna ports correspond with a second antenna panel of the UE; selecting a target set of antenna ports of the sets of antenna ports based on a determination that information associated with the target set of antenna ports satisfies a set of criteria; in response to a selection of the target set of antenna ports, sending a first message to the UE, wherein: the first message indicates the selection of the target set of antenna ports; and the first message causes the UE to use configuration parameters associated with the target set of antenna ports to enable communication of a set of Physical Uplink Shared Channel (PUSCH) layers associated with the target set of antenna ports; and receiving a second message from the UE via the set of PUSCH layers.

18. The system of implementation 17, wherein: obtaining the information associated with the sets of antenna ports comprises obtaining an initial message from the UE, wherein the initial message comprises first information associated with the first set of antenna ports and second information associated with the second set of antenna ports; selecting the target set of antenna ports comprises selecting the target set of antenna ports based on a comparison between a first value of the first information and a second value of the second information.

19. The system of any of implementations 17 to 18, the operations further comprising sending a downlink control information (DCI) message to the UE, wherein the DCI message triggers the selection of the target set of antenna ports.

20. The system of any of implementations 17 to 19, the operations further comprising sending, to the UE, a configured grant comprising an SRS resource indicator, wherein the SRS resource indicator is associated with an antenna port of the target set of antenna ports.

I claim:

1. A method, being performed by user equipment (UE) and comprising:

obtaining information associated with sets of antenna ports comprising a first set of antenna ports and a second set of antenna ports, wherein the first set of antenna ports correspond with a first antenna panel of the UE, and wherein the second set of antenna ports correspond with a second antenna panel of the UE;

selecting a target set of antenna ports of the sets of antenna ports based on a determination that information associated with the target set of antenna ports satisfies a set of criteria;

in response to a selection of the target set of antenna ports, configuring UE configuration parameters associated with the target set of antenna ports to associate an uplink transmission with a set of Physical Uplink Shared Channel (PUSCH) layers associated with the target set of antenna ports; and sending the uplink transmission to a base station (BS) via the set of PUSCH layers, wherein:

the target set of antenna ports is associated with a first SRS resource set;

the first SRS resource set comprises a first SRS resource and a second SRS resource;

the target set of antenna ports is associated with a second SRS resource set, wherein the second SRS resource set comprises a third SRS resource and a fourth SRS resource;

the method further comprises receiving a downlink control information (DCI); and selecting the target set of antenna ports comprises selecting the target set of antenna ports in response to receiving the DCI by:

determining whether multiple SRS resources are associated with the first SRS resource set; and in response to a determination that the multiple SRS resources are associated with the first SRS resource set, determining a PUSCH precoder and transmission rank based on the information associated with the target set of antenna ports.

2. The method of claim 1, wherein:

obtaining the information associated with the sets of antenna ports comprises obtaining the information associated with the sets of antenna ports from a local memory of the UE; and selecting the target set of antenna ports comprises sending a reporting message indicating the selection of an SRS resource set for a PUSCH transmission to the BS, wherein receiving the reporting message causes the UE to configure an antenna parameter of the UE to receive the PUSCH transmission.

3. The method of claim 1, wherein selecting the target set of antenna ports comprises selecting the target set of antenna ports using a selection logic of the UE.

4. The method of claim 1, wherein the UE comprises at least three antenna panels, and wherein the at least three antenna panels comprise the first antenna panel and the second antenna panel.

5. The method of claim 1, wherein:

sending the uplink transmission comprises sending a PUSCH transmission;

selecting the target set of antenna ports comprises selecting an SRS resource set;

the SRS resource set is associated with a set of UE configuration parameters;

selecting the SRS resource set causes the UE to configure the PUSCH transmission based on the set of UE configuration parameters.

6. The method of claim 5, wherein the set of UE configuration parameters comprises at least one of a maximal transmit power or a maximal number of layers in a PUSCH.

7. A user equipment (UE) comprising:

a first antenna panel controllable via a first set of antenna ports;

a second antenna panel controllable via a second set of antenna ports;

circuitry to perform operations comprising:

obtaining information associated with sets of antenna ports comprising the first set of antenna ports and the second set of antenna ports;

selecting a target set of antenna ports of the sets of antenna ports based on a determination that information associated with the target set of antenna ports satisfies a set of criteria;

in response to a selection of the target set of antenna ports, configuring UE configuration parameters associated with the target set of antenna ports to associate an uplink transmission with a set of Physical Uplink Shared Channel (PUSCH) layers associated with the target set of antenna ports; and sending the uplink transmission to a base station (BS) over the set of PUSCH layers, wherein:

the target set of antenna ports is associated with a first SRS resource set;

the first SRS resource set comprises a first SRS resource and a second SRS resource;

the target set of antenna ports is associated with a second SRS resource set, wherein the second SRS resource set comprises a third SRS resource and a fourth SRS resource;

the operations further comprise receiving a downlink control information (DCI); and selecting the target set of antenna ports comprises selecting the target set of antenna ports in response to receiving the DCI by:

determining whether multiple SRS resources are associated with the first SRS resource set; and in response to a determination that the multiple SRS resources are associated with the first SRS resource set, determining a PUSCH precoder and transmission rank based on the information associated with the target set of antenna ports.

8. The UE of claim 7, wherein:

the set of PUSCH layers is associated with a Type 1 PUSCH transmission;

selecting the target set of antenna ports comprises sending an indicator of an SRS resource set associated with the target set of antenna ports to the BS.

9. The UE of claim 7, the operations further comprising:

receiving a configured grant comprising an SRS resource indicator, wherein selecting the target set of antenna ports comprises selecting the target set of antenna ports based on the SRS resource indicator; and sending, to the BS, a reporting message comprising the SRS resource indicator, wherein receiving the reporting message causes the BS to update a BS antenna configuration based on parameters associated with the SRS resource indicator.

10. The UE of claim 7, wherein the target set of antenna ports comprises a plurality of antenna ports, wherein each antenna port of the target set of antenna ports is associated with a different layer of the set of PUSCH layers.

11. The UE of claim 7, wherein:

the set of PUSCH layers is associated with a Type 2 Physical Uplink Shared Channel transmission; and the operations further comprise receiving a DCI message comprising an SRS resource indicator, wherein:

selecting the target set of antenna ports comprises selecting the target set of antenna ports based on a determination that the target set of antenna ports is associated with the SRS resource indicator; and associating a SRS resource identified by the SRS resource indicator with the Type 2 Physical Uplink Shared Channel transmission.

12. The UE of claim 7, wherein:

the uplink transmission is a first PUSCH transmission; and selecting the target set of antenna ports comprises sending, using the second set of antenna ports, a second PUSCH transmission comprising a first identifier of a first resource set to the BS.

13. The UE of claim 7, wherein the DCI is formed in a DCI format 0_1 or a DCI format 0_2.

14. The UE of claim 7, wherein each respective PUSCH layer of the set of PUSCH layers corresponds with a respective resource of the first SRS resource set.

15. The UE of claim 7, wherein:

the target set of antenna ports is selected based on an initial message received via an RRC from the BS, wherein:

the initial message causes a semi-static configuration of PUSCH layers; and the semi-static configuration causes the UE to select the target set of antenna ports.

16. A base station (BS) comprising:

an antenna; and circuitry to perform operations comprising:

obtaining information associated with sets of antenna ports comprising a first set of antenna ports and a second set of antenna ports, wherein the first set of antenna ports corresponds with a first antenna panel of user equipment (UE), and wherein the second set of antenna ports correspond with a second antenna panel of the UE;

selecting a target set of antenna ports of the sets of antenna ports based on a determination that information associated with the target set of antenna ports satisfies a set of criteria;

in response to a selection of the target set of antenna ports, sending a first message to the UE, wherein:

the first message indicates the selection of the target set of antenna ports; and the first message causes the UE to use configuration parameters associated with the target set of antenna ports to enable communication of a set of Physical Uplink Shared Channel (PUSCH) layers associated with the target set of antenna ports; and receiving a second message from the UE via the set of PUSCH layers, wherein:

the target set of antenna ports is associated with a first SRS resource set;

the first SRS resource set comprises a first SRS resource and a second SRS resource;

the target set of antenna ports is associated with a second SRS resource set, wherein the second SRS resource set comprises a third SRS resource and a fourth SRS resource; and the operations further comprise sending a downlink control information (DCI) to the UE, wherein the DCI triggers the UE to select the target set of antenna ports by:

determining whether multiple SRS resources are associated with the first SRS resource set; and in response to a determination that the multiple SRS resources are associated with the first SRS resource set, determining a PUSCH precoder and transmission rank based on the information associated with the target set of antenna ports.

17. The BS of claim 16, wherein:

obtaining the information associated with the sets of antenna ports comprises obtaining an initial message from the UE, wherein the initial message comprises first information associated with the first set of antenna ports and second information associated with the second set of antenna ports;

selecting the target set of antenna ports comprises selecting the target set of antenna ports based on a comparison between a first value of the first information and a second value of the second information.

18. The BS of claim 16, wherein the operations further comprise sending, to the UE, a configured grant comprising an SRS resource indicator, wherein the SRS resource indicator is associated with an antenna port of the target set of antenna ports.

* * * * *